(12) United States Patent
Ben Yehuda et al.

(10) Patent No.: US 12,433,687 B2
(45) Date of Patent: Oct. 7, 2025

(54) DEVICE AND METHOD FOR GASTROINTESTINAL LOCATION ESTIMATION

(71) Applicant: PHOTOPILL MEDICAL LTD, Rehovot (IL)

(72) Inventors: Sharon Ben Yehuda, Rehovot (IL); Ram Ben Yehuda, Rehovot (IL); Semion Khait, Netanya (IL)

(73) Assignee: PHOTOPILL MEDICAL LTD, Rehovot (IL)

( * ) Notice: Subject to any disclaimer, the term of this patent is extended or adjusted under 35 U.S.C. 154(b) by 68 days.

(21) Appl. No.: 18/280,364

(22) PCT Filed: Mar. 20, 2022

(86) PCT No.: PCT/IL2022/050311
§ 371 (c)(1),
(2) Date: Sep. 5, 2023

(87) PCT Pub. No.: WO2022/185323
PCT Pub. Date: Sep. 9, 2022

(65) Prior Publication Data
US 2024/0115326 A1    Apr. 11, 2024

Related U.S. Application Data

(60) Provisional application No. 63/157,013, filed on Mar. 5, 2021.

(51) Int. Cl.
*A61B 34/20*     (2016.01)
*A61B 5/00*      (2006.01)
*A61B 5/06*      (2006.01)

(52) U.S. Cl.
CPC .............. *A61B 34/20* (2016.02); *A61B 5/067* (2013.01); *A61B 5/6861* (2013.01); *A61B 2034/2055* (2016.02)

(58) Field of Classification Search
CPC ....... A61B 34/20; A61B 5/067; A61B 5/6861; A61B 2034/2055; A61B 1/041;
(Continued)

(56) References Cited

U.S. PATENT DOCUMENTS

2006/0169294 A1 * 8/2006 Kaler ................. A61B 5/073
                                                    128/903
2012/0253204 A1   10/2012 Ben-Yehuda
(Continued)

FOREIGN PATENT DOCUMENTS

WO    2020031175 A1    2/2020
WO    2020178819 A1    9/2020

OTHER PUBLICATIONS

International Search Report and Written Opinion of the International Searching Authority for International Patent Appliation No. PCT/IL2022/050311 Mailed Jun. 22, 2022.
(Continued)

*Primary Examiner* — Jason M Ip
(74) *Attorney, Agent, or Firm* — John Desper; Eckert Seamans Cherin & Mellott, LLC

(57) ABSTRACT

An ingestible in-vivo gastrointestinal device constituted of: a power source; a processor and a memory; and a sensor, the processor, at least partially responsive to the sensor, to determine a location of the in-vivo gastrointestinal device as being in one of an esophagus, a stomach, a small intestine and a large intestine of a subject.

10 Claims, 7 Drawing Sheets

(58) Field of Classification Search
CPC .... A61B 2562/0219; A61B 2562/0233; A61B 2562/0257; A61B 5/073
See application file for complete search history.

(56) References Cited

U.S. PATENT DOCUMENTS

| | | |
|---|---|---|
| 2013/0237774 A1 | 9/2013 | Schentag |
| 2014/0081360 A1 | 3/2014 | Ben-Yehuda |
| 2015/0335264 A1 | 11/2015 | Rosenberg |
| 2017/0119278 A1 | 5/2017 | Hyde et al. |
| 2017/0238839 A1* | 8/2017 | Hyde ............... A61B 5/062 |
| 2018/0206769 A1 | 7/2018 | Pak |
| 2019/0232079 A1 | 8/2019 | Ben-Yehuda et al. |
| 2020/0253506 A1* | 8/2020 | Jones ............ A61B 10/0045 |
| 2021/0015398 A1 | 1/2021 | Jones |
| 2021/0161425 A1* | 6/2021 | Yangdai ........... A61B 5/6861 |

OTHER PUBLICATIONS

Extended European Search Report of Corresponding EP Patent application No. 22762748.6 dated Jan. 3, 2025.

* cited by examiner

DEVICE AND METHOD FOR GASTROINTESTINAL LOCATION ESTIMATION

CROSS-REFERENCE TO RELATED APPLICATIONS

This application is a national stage entry under 35 U.S.C. § 371 for PCT application PCT/IL2022/050311, filed 20 Mar. 2022, which claims priority to US provisional application U.S. 63/157,013, filed 5 Mar. 2021, the contents of both of which are hereby incorporated by reference in their entirety.

TECHNICAL FIELD

The present disclosure relates to medical devices in general, and more particularly to a device and method for estimating a location of an in-vivo device within the gastrointestinal tract.

BACKGROUND

In vivo devices are used in many bodily lumens, such as the arterial system, the digestive system, or the respiratory system, and for a wide variety of medical applications. Such applications may include but are not limited to imaging purposes, endoscopic surgeries, heart catheterization, intestine diagnostic using capsules, and others. Many of these procedures need to be carried out at a specific location within the bodily lumen, and thus require the identification of the location of a device within the human body.

For example, an in-vivo gastrointestinal device (IVGD) is known, which can be ingested orally and progresses through the digestive tract. It would be desirable to provide identification information regarding the stage of the digestive tract in which the IVGD is located, so as to properly address information provided by the IVGD and potentially taking an action (such as releasing medication, initiating a treatment, or performing a medical procedure) based on its location.

SUMMARY

Accordingly, it is a principal object to overcome at least some of the disadvantages of the prior art. Certain examples enable an ingestible in-vivo gastrointestinal device comprising: a power source; a processor and a memory; and a sensor, the processor, at least partially responsive to the sensor, to determine a location of the in-vivo gastrointestinal device as being in one of an esophagus, a stomach, a small intestine and a large intestine of a subject.

In some examples, the locations are determined sequentially. In some examples the sensor is a 3-axis inertial sensor. In some examples, the 3-axis inertial sensor is positioned such that movement of the ingestible in-vivo gastrointestinal device along a longitudinal axis of the ingestible in-vivo gastrointestinal device will show an acceleration dominantly on a predetermined one of the axes of the 3-axis inertial sensor.

In some examples, the processor, responsive to a sequential motion being dominant on the predetermined one of the axes, determines the location of the in-vivo gastrointestinal device as being in the esophagus or the small intestine.

In some examples the processor, responsive to the sequential motion on the predetermined one of the axes not being dominant, determines the location of the in-vivo gastrointestinal device as being in the stomach or the large intestine.

In some examples the sensor is an optical motion sensor. In some examples, a predetermined axis of the optical motion sensor is aligned with a longitudinal axis of the ingestible in-vivo gastrointestinal device. In some examples, the processor, responsive to sequential motion along the predetermined axis being dominant, determines the location of the in-vivo gastrointestinal device as being in the esophagus or the small intestine. In some examples, the processor, responsive to sequential motion along the predetermined axis not being dominant, determines the location of the in-vivo gastrointestinal device as being in the stomach or the large intestine.

In some examples, the sensor is a plurality of proximity sensors. In some examples the processor, responsive to the plurality of proximity sensors all indicating proximity, determines the location of the in-vivo gastrointestinal device as being in the esophagus or the small intestine. In some examples, the processor, responsive to at least one of the plurality of proximity sensors not indicating proximity, determines the location of the in-vivo gastrointestinal device as being in the stomach or the large intestine.

In some examples, the sensor is a plurality of proximity sensors located on a circumference of the in-vivo gastrointestinal device.

Independently, the example enable a method of determining a location of an in-vivo gastrointestinal device, the method comprising: providing the in-vivo gastrointestinal device with a 3-axis inertial sensor; responsive to an initial indication from the 3-axis inertial sensor that sequential motion along a predetermined one of the axes is dominant, determining the provided in-vivo gastrointestinal device is located in an esophagus; subsequently, responsive to an indication from the 3-axis inertial sensor that sequential motion along the predetermined one of the axes is not dominant, determining the provided in-vivo gastrointestinal device is located in a stomach; subsequently, responsive to an indication from the 3-axis inertial sensor that sequential motion along the predetermined one of the axes is again dominant, determining the provided in-vivo gastrointestinal device is located in a small intestine; and subsequently, responsive to an indication from the 3-axis inertial sensor that sequential motion along the predetermined one of the axes is again not dominant, determining the provided in-vivo gastrointestinal device is located in a large intestine.

Independently, the example enable a method of determining a location of an in-vivo gastrointestinal device, the method comprising: providing the in-vivo gastrointestinal device with an optical motion sensor; responsive to an initial indication from the optical motion sensor that sequential motion along a predetermined axis of the optical motion sensor is dominant, determining the provided in-vivo gastrointestinal device is located in an esophagus; subsequently, responsive to an indication from the optical motion sensor that sequential motion along the predetermined axis of the optical motion sensor is not dominant, determining the provided in-vivo gastrointestinal device is located in a stomach; subsequently, responsive to an indication from the optical motion sensor that sequential motion along the predetermined axis of the optical motion sensor is again dominant, determining the provided in-vivo gastrointestinal device is located in a small intestine; and subsequently, responsive to an indication from the optical motion sensor that sequential motion along the predetermined axis of the optical motion sensor is again not dominant, determining the provided in-vivo gastrointestinal device is located in a large intestine.

Independently, the example enable a method of determining a location of an in-vivo gastrointestinal device, the method comprising: providing the in-vivo gastrointestinal device with a plurality of proximity sensors; responsive to an initial indication from the plurality of proximity sensors that all of the proximity sensors indicate proximity, determining the provided in-vivo gastrointestinal device is located in an esophagus; subsequently, responsive to an indication from the plurality of proximity sensors that not all of the proximity sensors indicate proximity, determining the provided in-vivo gastrointestinal device is located in a stomach; subsequently, responsive to an indication from the plurality of proximity sensors that all of the proximity sensors again indicate proximity, determining the provided in-vivo gastrointestinal device is located in a small intestine; and subsequently, responsive to an indication from the plurality of proximity sensors that not all of the proximity sensors again indicate proximity, determining the provided in-vivo gastrointestinal device is located in a large intestine.

Independently, the example enable a method of determining a location of an in-vivo gastrointestinal device, the method comprising: providing the in-vivo gastrointestinal device with a 3-axis inertial sensor, an optical motion sensor or a proximity sensor; and sequentially determining a location of the in-vivo gastrointestinal device as being in one of an esophagus, a stomach, a small intestine and a large intestine of a subject responsive to the provided 3-axis inertial sensor, optical motion sensor or proximity sensor.

Additional features and advantages of the invention will become apparent from the following drawings and description.

BRIEF DESCRIPTION OF THE DRAWINGS

For a better understanding of certain embodiments and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments only, and are presented in the cause of providing what is believed to be the most useful and readily understood description of the principles and conceptual aspects. In this regard, no attempt is made to show structural details in more detail than is necessary for a fundamental understanding, the description taken with the drawings making apparent to those skilled in the art how the several forms may be embodied in practice. In the accompanying drawings.

DETAILED DESCRIPTION

One aspect of the disclosed subject matter relates to an in-vivo gastrointestinal device (IVGD) with an internal processor and a sensor to determine the location of the IVGD within a subject gastrointestinal (GI) tract. The IVGD comprises an ingestible device, such as a capsule or implantable device, which includes a processor and an on-board sensor (such as a 3-axis inertial sensor, an optical motion sensor or a proximity sensor). The processor, at least partially responsive to the on-board sensor, senses the motion of the IVGD through the digestive tract of a subject, and determines if the IVGD is in the esophagus, stomach, the small intestine, or the large intestine.

Determining the location of the IVGD enables taking an action (such as releasing medication, initiating a treatment, imaging, or performing a medical procedure) based on its location. Thus medication, treatment, imaging or a procedure designated for a particular portion of the GI tract, e.g., for a particular one of the esophagus, stomach, small intestine or large intestine, may be controlled so as not to occur when the IVGD is not in the designation particular portion.

The outer shell of the IVGD is such that the IVGD can freely move about in the stomach, it is limited in motion when in the small intestine, and can again move relatively freely in the large intestine. An elongate device shaped generally as an oval element (a plastic capsule for example) with an axial diameter of 5 mm to 20 mm (as an example), will be confined to a single axis motion in the esophagus and in the small intestine as the small intestine average diameter is about 10 mm (the small intestine can accommodate higher diameters being a flexible tissue) but will move freely in all axes when located in the stomach or the large intestine, i.e. will not be confined to single axis motion in the stomach or large intestine.

Other shapes for the outer shell of the IVGD can be considered as long as the diameter of the IVGD complies with the above restrictions and the shape of the IVGD prevents it from flipping when in the small intestine or esophagus.

An elongate IVGD (wherein the longitudinal dimension is greater than the axial dimension) is an example outer shell shape for the IVGD. Once transitioned from the small intestine into the large intestine, the IVGD moves freely in all axes as the average diameter of the large intestine is around 30 mm. In one particular example, as illustrated in FIG. 5A, the IVGD is a capsule shaped outer shell with a longitudinal dimension about twice the axial dimension, e.g. a longitudinal dimension of 22 mm with an axial dimension of about 12 mm.

Figure 5:
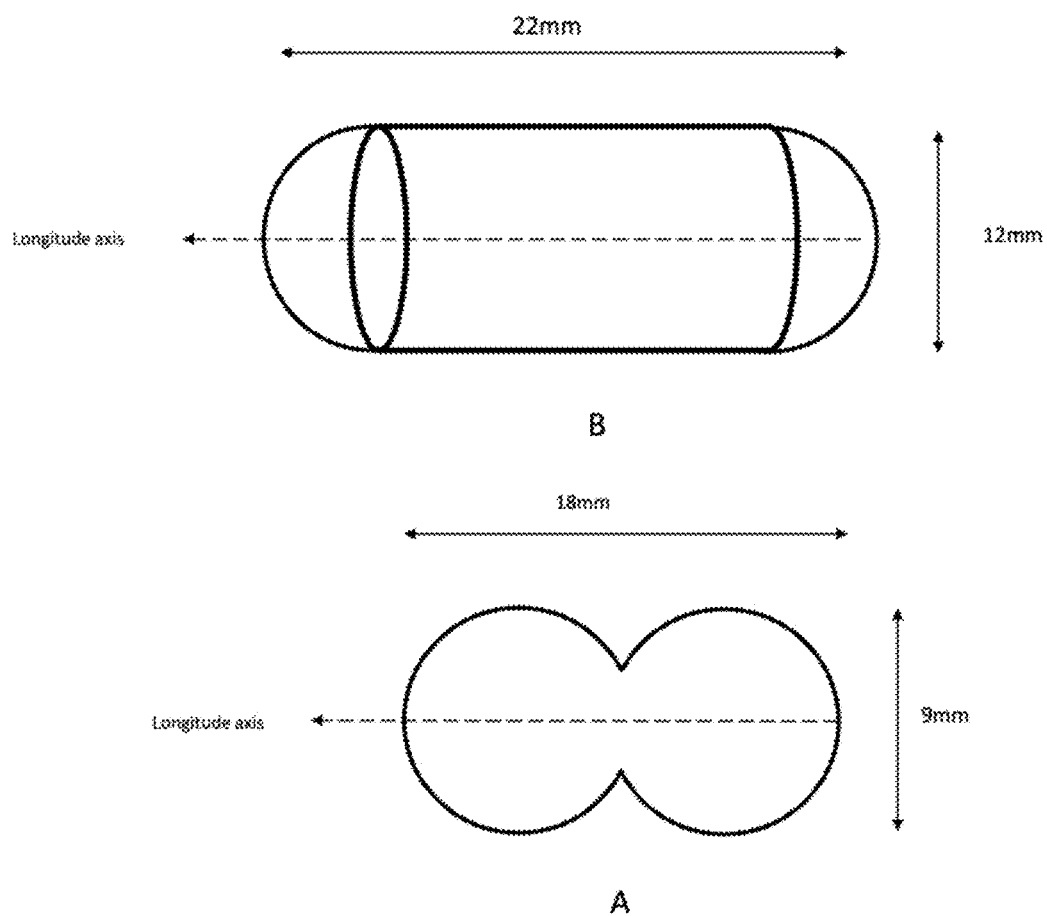
FIGS. 5A-5B illustrate examples of IVGD shapes and sizes.

In another example, illustrated in FIG. 5B, the elongate IVGD is formed as dual ball shaped compartments, each with a diameter of 9 mm connected at the center. As a result, in this example, the elongate IVGD exhibits a longitudinal dimension of 18 mm and an axial dimension of 9 mm, which will be confined to a single axis motion in the esophagus and in the small intestine but will move freely in all axes when located in the stomach or the large intestine, i.e. will not be confined to single axis motion in the stomach or large intestine. The capsule shaped outer shell exhibits a longitudinal dimension about twice the axial dimension, which forces the IVGD to travel in a single axis while in the esophagus and small intestine.

Figure 4:
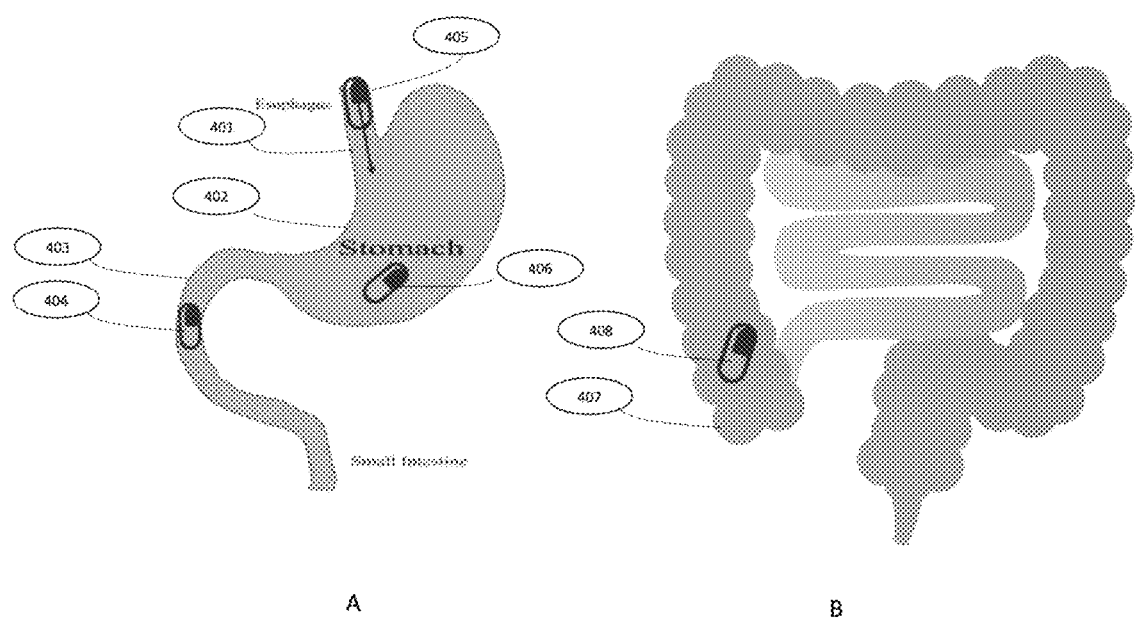
FIG. 4A illustrates the position of the IVGD within the upper gastrointestinal tract.
FIG. 4B illustrates the position of the IVGD within the lower gastrointestinal tract.

Referring to FIG. 4A the position of the IVGD within the gastrointestinal tract is illustrated. In the esophagus (401), because of its size and shape, the tissue of the esophagus constrains the IVGD so as to allow movement of the IVGD in only one direction, i.e. longitudinally, and there is continues contact between the esophageal tissue and the IVGD on all sides. In the stomach (402), the IVGD's dimensions are much smaller than those of the stomach, the IVGD moves about in all directions (406) and is not confined to a single axis movement. When the IVGD transitions into the small intestine (403) at the duodenum, the IVGD is again confined to a single axis movement, in the longitudinal direction, as the dimensions of the small intestine do not allow for any other directional movement for the IVGD, since the small intestinal tissue is collapsed around the IVGD (404) and in close proximity to the IVGD in all surrounding, i.e. axial, directions. Referring to FIG. 4B, when the IVGD reaches the large intestine (407), it is not limited to a single axis motion and the large intestinal tissue is not in close proximity to the IVGD in all surrounding directions (408) due to the diameter of the large intestine relative to the diameter of the IVGD.

As indicated above, the subject ingestible IGVD has at least one on-board sensor. A plurality of sensor types, appropriate for use herein, will now be described, it being understood that the description is not meant to be limiting in any way.

The at least one on-board sensor may be: a 3-axial inertial sensor incorporating one or more of a triaxial accelerometer, triaxial gyroscope and triaxial magnetometer, such as Bosh Sensotech's BMX055; an optical motion sensor, such as an XY optical motion sensor; or a proximity sensor, such as a capacitive, inductive, or optical proximity sensor.

An accelerometer, such as ST Microelectronics' LIS2DH12 (but not limited to this sensor) is an example of a 3-axial inertial sensor that provides 3 axis acceleration sensing capabilities. If acceleration occurs in any direction, the reading of the X, Y and Z internal acceleration sensors provide the amount of acceleration in that axis so as to enable a calculation of the 3-dimentional acceleration vector.

An optical XY sensor (such as the PAT9125 or PAW3007 available from PixArt Imaging, Inc. of Taiwan) is an example optical motion sensor, which is designed to sense movement of an adjacent surface in 2 axis motion (x and y). The optical motion sensor provides X and Y readings, which appear to be random, if there is no surface moving in a vicinity of several millimeters (typically up to 5 mm) from the sensor. If the sensor is located close to a surface, such as esophageal or intestinal tissue, the optical motion sensor provides steady X and Y readings. When the IVGD is in the stomach or large intestine, X and Y readings will not be steady, and when the IVGD is in the esophagus or the small intestine, X and Y readings will be steady due to linear movement of the IVGD.

Figure 3:
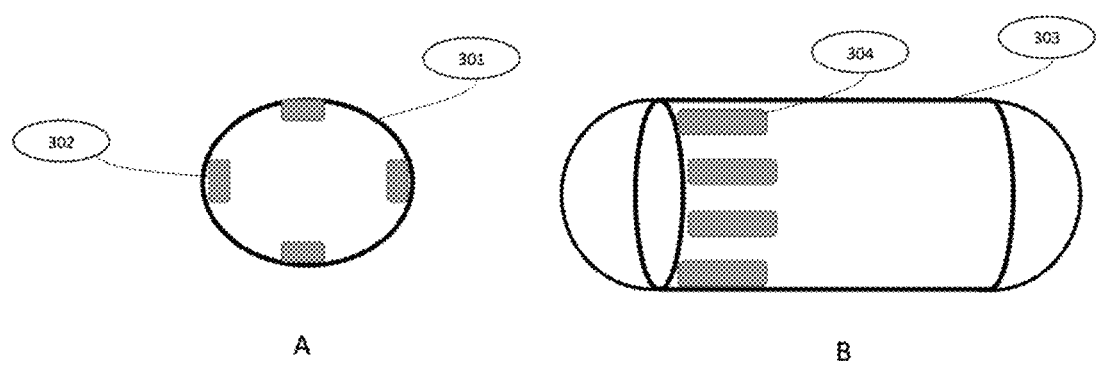
FIG. 3A illustrates a front view of a capsule shaped IVGD with 4 proximity sensors.
FIG. 3B illustrates a perspective view of the capsule shaped IVGD of FIG. 3A.

A proximity sensor, such as Silicon Labs's Si1102 or Vishay's VCNL3036X01 optical proximity sensor, may be utilized. Other examples of proximity sensors may be capacitive or inductive proximity sensors, or ultrasonic sensors. In one example, as illustrated in FIG. 3A and FIG. 3B, which illustrate a front view and a perspective view, respectively, of a capsule shaped IVGD with 4 proximity sensors, multiple proximity sensors may be placed around the circumference of the IVGD, i.e. attached to an inner wall of the shell of the IVGD facing outword. The multiple proximity sensors may be placed with radial symmetry. Due to the size and shape of the IVGD, once in the stomach, or large intestine, at least one of the multiple proximity sensors will not output a signal indicative of proximity to any tissue or will output a proximity reading larger then several millimeters (5 mm for example). When the IVGD is in the esophagus or the small intestine, all proximity sensors will measure proximity to a tissue of less then 5 mm for example, (as the small intestine tissue will be collapsed on the IVGD because of its size and shape).

Figure 2:
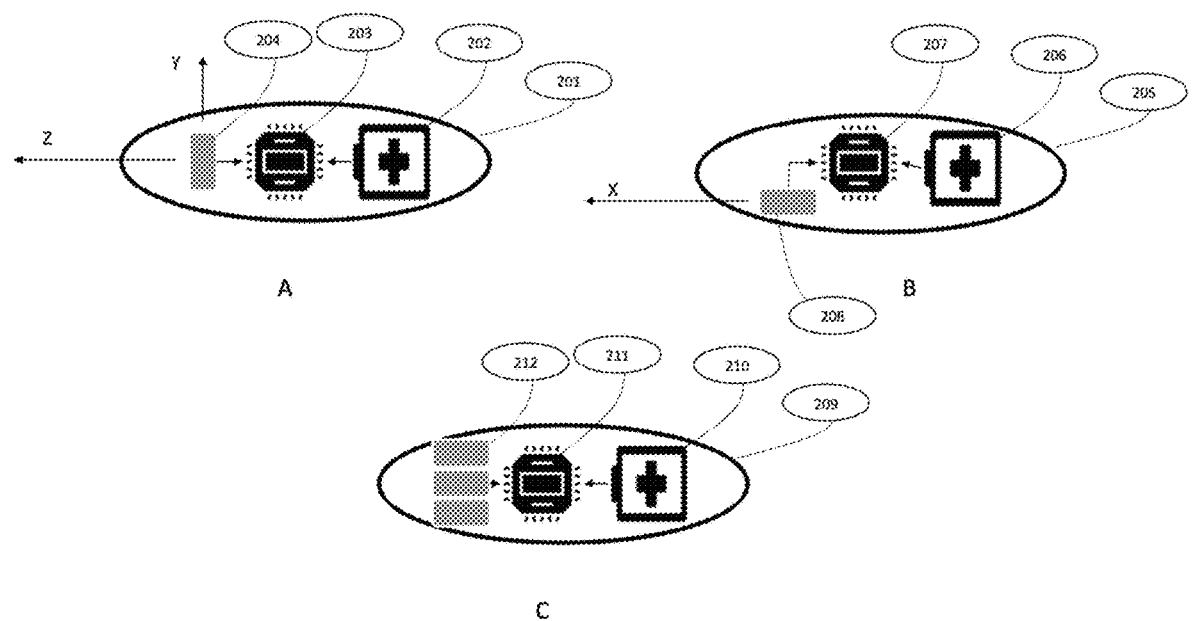
FIG. 2A illustrates a high-level diagram of a capsule shaped IVGD with an example inertial sensor.
FIG. 2B illustrates a high-level diagram of a capsule shaped IVGD with an optical movement sensor.
FIG. 2C illustrates a high-level diagram of a capsule shaped IVGD with multiple proximity sensors.

FIG. 2A-2C illustrate several optional sensors for detecting the location of the IVGD. All of the example IVGDs exhibit a power source 202, a processor and memory 203 and a respective sensor. Any required electrical interfaces are similarly included (not shown). The memory stores non-transitory electronically readable instructions, which when read by the processor, cause the processor to determine the location of the IGVD. In FIG. 2A an inertial sensor 204 is on-board within a capsule shaped IVGD 201, with the Z axis of the inertial sensor positioned such that forward or backward movement of the IVGD 201 along a longitude axis of the IVGD will output an acceleration from the inertial sensor 204 dominantly on the Z axis. In another example, any of the axes, i.e. X, Y or Z, of the inertial sensor 204 is aligned with the longitudinal axis of the IVGD 201.

In FIG. 2B an IVGD 205 in a capsule shaped shell contains an optical motion sensor 208 and the optical motion sensor 208 faces the surrounding tissue through a transparent wall of the IVGD 205, such that the longitudinal axis of the IVGD is aligned with one of the sensor's axes, shown without limitation as the X axis.

In FIG. 2C an IVGD 209 in a capsule shaped shell contains multiple proximity sensors 212 located on the IVGD's circumference, which may be attached to an external wall of the IVGD 209, are internally placed, as described in relation to FIGS. 3A-3B and facing outward towards the surrounding gastric tissue.

The above has been described in an example where only a single type of sensor is provided, it being understood that a combination of more than one of the above sensors may be provided for improved performance.

The method described herein are based, at least partially, on identifying the movement in several axes (as in the stomach and large intestine) versus a single axes motion in the small intestine.

When the IVGD is removed from its package or case, it is activated, and the software enters a stand-by condition. When the IVGD is administered orally (with a glass of drinking water), it travels through the esophagus (a short travel time of several seconds) until it reaches the stomach.

The IVGD remains in the stomach for a certain amount of time, 30 minutes as an example, until it is moved into the Duodenum by the stomach's natural contraction movements. The IVGD then travels down the small intestine driven by the intestine's natural peristaltic motion until it reaches the large intestine, where it remains until naturally evacuated from the gastric system.

FIG. TA illustrates a method of determining location of an IVGD by using a 3-axis inertial sensor to determine the transition of the IVGD to the stomach, from the stomach to the small intestine and from the small intestine to the large intestine. A 3-axis inertial sensor, such as an LIS2DH12 from ST Microelectronics, provides information as to the movement of the inertial sensor, and therefore the IVGD containing the inertial sensor, in a 3-axis environment denoted X,Y and Z. The 3-axis inertial sensor is positioned in the IVGD such that a predetermined one of the axes (in this example—the Z axis is utilized, without limitation) is facing the front of the IVGD as described in relation to FIG. 2A. The algorithm assumes that the user is still (lying in bed or sitting in a chair) with minimal movement, to remove external noise (such as walking or moving), or alternatively these noises can be removed by the use of an external 3-d inertial sensor in wireless communication with the processor of the IVGD. In the case of the external reference inertial sensor (which needs to be attached to the patient, for example—as a wearable device, which can communicate its readings to the IVGD via wireless communication), the readings from a wearable reference inertial sensor are subtracted from the readings of the IVGD's inertial sensor, to be able to use the net IVGD's motion in the algorithm.

The IVGD is activated upon removal from its case, i.e. the processor is powered on, and the IVGD receives the outputs of the inertial sensor. The IVGD is ingested orally with fluids (such as a glass of drinking water). The first part of the gastrointestinal tract is the esophagus where the output of the inertial sensor are dominantly indicative of motion in the Z axis for several sequential readings (such as for over 1 second). As long as the output of the inertial sensor are dominantly indicative of motion in the Z axis (101), the IVGD is tagged as located in the esophagus. Until the output of the inertial sensor are dominantly indicative of motion in the Z axis (101), the IVGD continues to read the outputs of the inertial sensor. The travel through the esophagus normally takes a few seconds, until it reaches the stomach. A delay (102) is applied to make sure the IVGD has passed the esophagus and reached the stomach (103).

Once the IVGD is in the stomach, because of its size, it moves about in all axes randomly and the inertial sensor provides X, Y and Z outputs which signal the software that it is still located in the stomach. A contributing factor to the 3-D motion is the fact that a fluid is used to administer the IVGD, which increases the stomach's volume and allows a freer 3-D movement of the IVGD within the stomach. The movement is sensed by the motion sensor, and is used by the software algorithm to determine that the IVGD is in the stomach.

When the outputs of the inertial sensor show a dominant sequential Z acceleration (104), which continues for at least a predetermined minimum time, e.g., for a minimum of 10 seconds, this indicates that the IVGD has left the stomach and is now in the small intestine (105). Until the outputs of the inertial sensor show the dominant sequential Z acceleration (104), which continues for at least the predetermined minimum time, the processor software continues to monitor the inertial sensor outputs.

When the IVGD transitions from the stomach to the small intestine, a dominant single axis movement begins (for example—Z axis movement mainly), which lasts few hours (typically 2-3 hours) based on the body's natural peristaltic rate and motility. As shown, as long as the inertial sensor outputs continue to indicate dominant single axis movement, state 105 is maintained, i.e. the IVGD is determined to be in the small intestine. When the IVGD transitions from the small intestine to the large intestine (106), a 3 axis movement begins, i.e. the inertial sensor outputs do not continue to indicate dominant single axis movement, since the 3 axis movement is sensed by the motion sensor as an X,Y,Z motion. This motion remains until the IVGD naturally evacuates or removed from the body. Once the IVGD has reached the large intestine, the outputs of the inertial sensor will be randomly of X, Y and Z, which is an indication that the IVGD is in the large intestine (106).

Figure 1A:
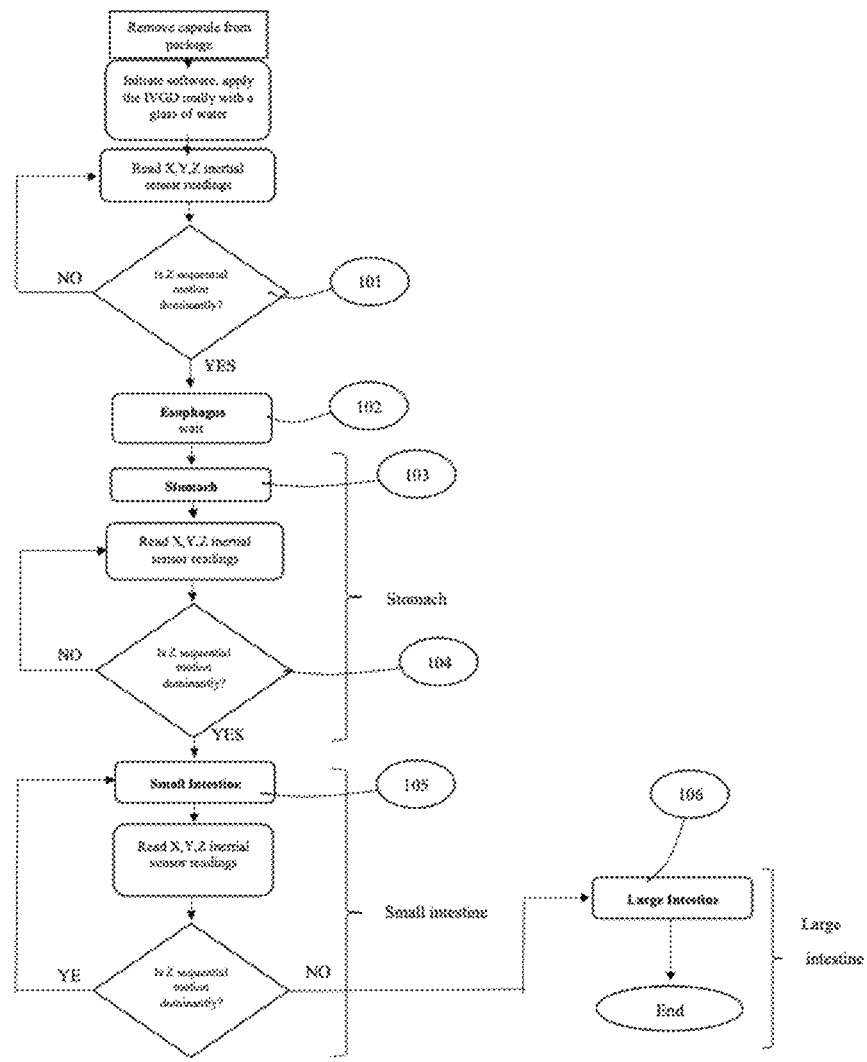
FIG. 1A is a high-level flow chart of an example location estimation algorithm based on an inertial sensor.
Figure 1B:
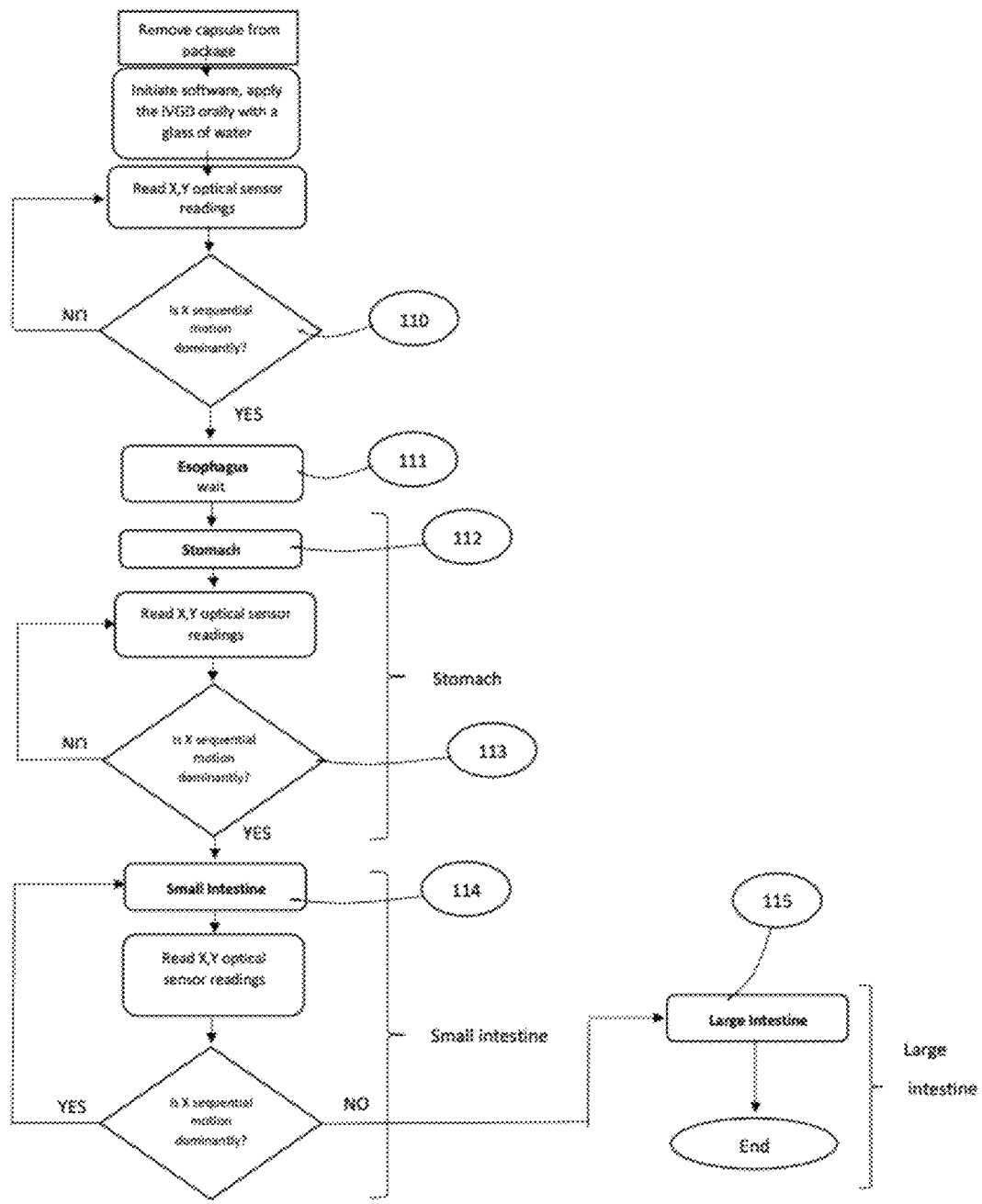
FIG. 1B is a high-level flow chart of an example location estimation algorithm based on an optical motion sensor.

FIG. 1B illustrates a method of determining location of an IVGD by using an optical motion sensor to determine the transition of the IVGD to the stomach, from the stomach to the small intestine and from the small intestine to the large intestine. The use of an optical motion sensor for detecting the motion of the IVGD is based on the fact that the optical motion sensor detects a movement of a surface which is adjacent to the sensor, derived from an array of an optical motion sensor or an imager. The optical motion sensor is designed to sense the relative movement of the surface relative to the optical motion sensor, thus providing an X and Y distance traveled readouts over time.

The optical motion sensor is located close to the IVGD's external shell, so that it is positioned close to the tissue (for example, in a 3 mm distance) when the IVGD is in the esophagus or small intestine, so that it can measure the movement of the IVGD relative to the tissue.

When the IVGD travels down the gastric tract, it will provide readouts for X and Y movement. When the IVGD travels via a tubular organ where the size and shape of the IVGD dictates that the surrounding tissue is close to the IVGD's shell (such as with traveling through the esophagus or the small intestine), the optical motion sensor provides a reading from a single axis mainly, while demonstrating a steady increase in the measured value as the IVGD travels, based on how the sensor is positioned relative to the IVGD travel (for example—an X reading mainly). When the IVGD is moving randomly in all directions (such as in the stomach or large intestine), it provides random readings both for X and Y.

The method of FIG. 1B is based on an optical motion sensor measurement located within the IVGD (as illustrated in FIG. 2B) where the X-axis is defined in the direction of the IVGD's longitudinal axis, it being understood by those skilled in the art that the Y-axis could be substituted for the X-axis, i.e. a predetermined one of the axes is defined in the direction of the IVGD's longitudinal axis. The IVGD is activated upon removal from its case, and the IVGD begins to obtain the output of the optical motion sensor. The IVGD is administered orally as described above.

The first part of the gastrointestinal tract is the esophagus where the output of the optical motion sensor are dominantly in the X axis for several sequential readings (such as for over 1 second). As long as this readout continues (110), the IVGD is tagged as located in the esophagus. As long as the output of the optical motion sensor are dominantly indicative of motion in the X axis (110), the IVGD continues to read the outputs of the optical motion sensor. The travel through the esophagus normally takes a few seconds, until it reaches the stomach. An optional delay (111) is applied to make sure the IVGD has passed the esophagus and reached the stomach (112).

Once in the stomach, because of its size, the IVGD moves about in all axes randomly, and the optical motion sensor provides random X and Y outputs which are indicative that the IVGD is still located in the stomach. When the outputs of the optical motion sensor show a dominant sequential X movement (113), which continues for at least a predetermined minimum time, for example, for a minimum of 10 seconds, this indicates that the IVGD has left the stomach and is now in the small intestine (114). As long as the outputs of the optical motion sensor show the dominant sequential X movement, which continues for at least the predetermined minimum time, the processor software continues to monitor the optical motion sensor outputs.

As long as the output of optical motion sensor indicate a dominant sequential X movement, the IVGD is tagged as being within the small intestine. This will typically be for a duration of several hours (typically 2-3 hours) based on the body's natural peristaltic rate and motility. As shown, as long as the optical motion sensor outputs continue to indicate dominant sequential X movement, state 114 is maintained, i.e. the IVGD is determined to be in the small intestine. When the IVGD transitions from the small intestine to the large intestine (115), the output of optical motion sensor will randomly show a movement of X, Y, i.e. the optical motion sensor outputs do not continue to indicate dominant sequential X movement, as described above in relation to state 112, which is an indication that the IVGD has reached the large intestine, and has transitioned from the small intestine into the large intestine (115). The random X,Y movement continues until the IVGD naturally evacuates or removed from the body.

Figure 1C:
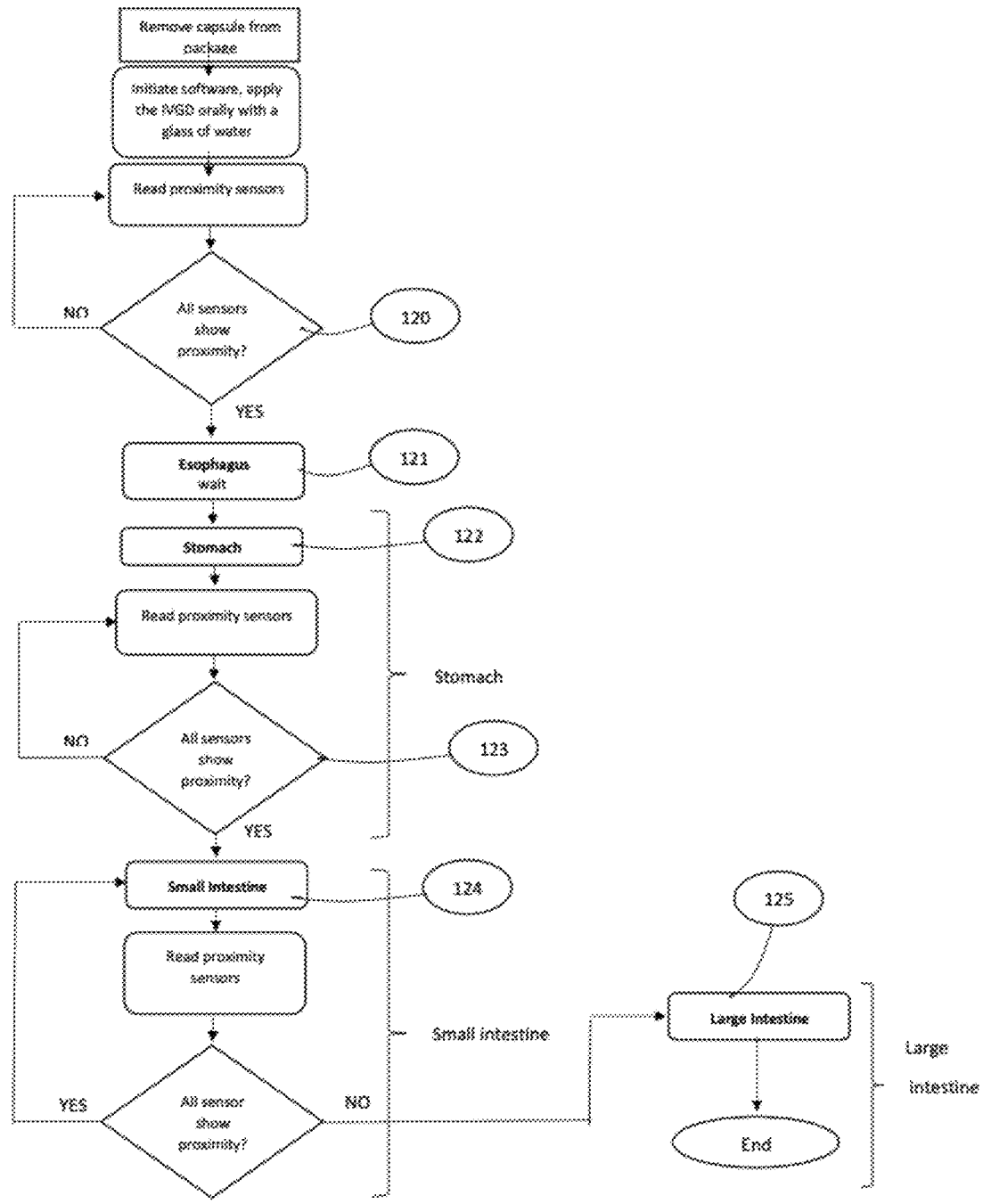
FIG. 1C is a high-level flow chart of an example location estimation algorithm based on an inertial sensor.

FIG. 1C illustrates a method of determining location of an IVGD by using a proximity sensor to determine the transition of the IVGD to the stomach, from the stomach to the small intestine and from the small intestine to the large intestine. A proximity sensor, which can be based on inductive, acoustic or optical detection, is a sensor which provides a reading as to the proximity of an object (in this case—the surrounding gastrointestinal tissue) to the sensor. The proximity sensors are placed on the circumference of the IVGD, facing outward, and include multiple sensors (for example 3 or more), as described in relation to FIGS. 2C, 3A and 3B.

Based on the size and shape of the IVGD, the only places where the IVGD is fully surrounded by a tissue in a very close proximity to the sensors are the esophagus and the small intestine. In any other location in the gastrointestinal tract, the IVGD will only have partial proximity to surrounding tissue and therefore not all the proximity sensors will indicate a proximity condition.

Monitoring the output of the proximity sensors throughout the IVGD's travel in the gastrointestinal tract provides an indication of the IVGD's location—in the esophagus and small intestine, all sensors on the IVGD's circumference, will output an indication of close proximity to tissue, and in the stomach and large intestine—not all of the sensors will output an indication of close proximity to tissue.

The IVGD is activated upon removal from its case, i.e. the processor is powered on, and the IVGD receives the outputs of the proximity sensors. The IVGD is ingested orally with fluids (such as a glass of drinking water). The first part of the gastrointestinal tract is the esophagus where the output of all of the proximity sensors readout show close proximity for several sequential readings (such as for over 1 second). As long as this continues (120), the IVGD is tagged as located in the esophagus. The IVGD continues to read the outputs of the proximity sensors periodically. The travel through the esophagus normally takes a few seconds, until it reaches the stomach. An optional delay (121) is applied to make sure the IVGD has passed the esophagus and reached the stomach (122).

Once the IVGD is in the stomach, because of its size, the IVGD moves around randomly and at least one of the proximity sensors will not show close proximity which signals the processor that it is still located in the stomach. When the output of the proximity sensors indicate a close proximity from all the sensors reading (123), which continues for at least a predetermined minimum time, for example, for a minimum of 10 seconds, this indicates that the IVGD has left the stomach and is now in the small intestine (124). The processor continues to monitor the proximity sensors periodically.

As long as the outputs of the proximity sensors all indicate close proximity, the IVGD is tagged as being within the small intestine. This will typically be for a duration of several hours (typically 2-3 hours) based on the body's natural peristaltic rate and motility. Once the IVGD has reached the large intestine, the gastric tissue is no longer collapsed on the IVGD and the output of at least one proximity sensor will not indicate a close proximity measurement anymore. This would be an indication that the IVGD has transitioned from the small intestine into the large intestine (125). This condition remains until the IVGD naturally evacuates or removed from the body.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

The invention claimed is:

1. An ingestible in-vivo gastrointestinal device comprising:
  a power source;
  a processor and a memory; and
  at least one sensor, configured to provide sensor signals indicative of the device in a digestive tract of a subject,
  the processor, configured to sequentially determine a location of the in-vivo gastrointestinal device as being in one of an esophagus, a stomach, a small intestine and a large intestine of the subject, responsive to the received signals,
  wherein the processor is configured to determine the location of the device as being in the esophagus or the small intestine, responsive to a dominant single axis movement of the device for at least a predetermined minimum time, and to determine the location of the device as being in the stomach or the large intestine, responsive to a multi-axis movement of the device for at least a predetermined minimum time.

2. The ingestible in-vivo gastrointestinal device according to claim 1, wherein the processor is configured to:
  determine the location of the device as being in the esophagus, responsive to a first group of sensor signals indicative of a dominant single axis movement of the device for at least a predetermined minimum time;

subsequently determine the location of the device as being in the stomach, responsive to a second group of subsequent sensor signals indicative of a multi-axis movement of the device for at least a predetermined minimum time;

subsequently determine the location of the device as being in the small intestine, responsive to a third group of subsequent sensor signals indicative of a dominant single axis movement of the device for at least a predetermined minimum time; and subsequently determine the location of the device as being in the large intestine, responsive to a fourth group of subsequent sensor signals indicative of a multi-axis movement of the device for at least a predetermined minimum time.

3. The ingestible in-vivo gastrointestinal device according to claim 1, wherein the sensor comprises a 3-axis inertial sensor, is positioned such that movement of the device along a longitudinal axis of the device will show a dominant acceleration on a predetermined one of the axes of the 3-axis inertial sensor, wherein the dominant acceleration is associated with the dominant single axis movement of the device.

4. The ingestible in-vivo gastrointestinal device according to claim 1, wherein the sensor comprises an optical motion sensor, wherein a predetermined axis of the optical motion sensor is aligned with a longitudinal axis of the device, wherein the optical motion sensor indicating dominant motion along the predetermined axis is associated with the dominant single axis movement of the device.

5. The ingestible in-vivo gastrointestinal device according to claim 1, wherein the sensor is comprises a plurality of proximity sensors located on a circumference of the device, wherein the proximity sensors all indicating a close proximity to surrounding tissue is associated with a dominant single axis movement of the device, and at least one of the proximity sensors not indicating a close proximity to surrounding tissue is associated with the multi-axis movement of the device.

6. A method of determining a location of an in-vivo gastrointestinal device, the method comprising:

providing the in-vivo gastrointestinal device with at least one sensor, configured to provide sensor signals indicative of the device in a digestive tract of a subject; and sequentially determining a location of the in-vivo gastrointestinal device as being in one of an esophagus, a stomach, a small intestine and a large intestine of the subject, responsive to the received sensor signals, wherein sequentially determining a location of the device comprises:

determining the location of the device as being in the esophagus or the small intestine, responsive to a dominant single axis movement of the device for at least a predetermined minimum time, and;

determining the location of the device as being in the stomach or the large intestine, responsive to a multi-axis movement of the device for at least a predetermined minimum time.

7. The method according to claim 6, wherein sequentially determining a location of the device comprises:

determining the location of the device as being in the esophagus, responsive to a first group of sensor signals indicative of a dominant single axis movement of the device for at least a predetermined minimum time;

subsequently determining the location of the device as being in the stomach, responsive to a second group of subsequent sensor signals indicative of a multi-axis movement of the device for at least a predetermined minimum time;

subsequently determining the location of the device as being in the small intestine, responsive to a third group of subsequent sensor signals indicative of a dominant single axis movement of the device for at least a predetermined minimum time; and subsequently determining the location of the device as being in the large intestine, responsive to a fourth group of subsequent sensor signals indicative of a multi-axis movement of the device for at least a predetermined minimum time.

8. The method according to claim 6, wherein:

the sensor comprises a 3-axis inertial sensor, positioned such that movement of the device along a longitudinal axis of the device will show a dominant acceleration on a predetermined one of the axes of the 3-axis inertial sensor, and the dominant acceleration is associated with the dominant single axis movement of the device.

9. The method according to claim 6, wherein:

the sensor comprises an optical motion sensor, a predetermined axis of the optical motion sensor is aligned with a longitudinal axis of the device, and the optical motion sensor indicating dominant motion along the predetermined axis is associated with the dominant single axis movement of the device.

10. The method according to claim 6, wherein:

the sensor comprises a plurality of proximity sensors located on a circumference of the device, the proximity sensors all indicating a close proximity to surrounding tissue is associated with a dominant single axis movement of the device, and at least one of the proximity sensors not indicating a close proximity to surrounding tissue is associated with the multi-axis movement of the device.

* * * * *